United States Patent [19]
Sakagami et al.

[11] Patent Number: 5,038,332
[45] Date of Patent: Aug. 6, 1991

[54] OPTICAL INFORMATION RECORDING MEDIUM INCLUDING AN OPTICALLY DETECTABLE MARK REPRESENTING A BOUNDARY BETWEEN THE RECORDING AND NON-RECORDING AREAS

[75] Inventors: Wataru Sakagami; Yutaka Ogasawara, both of Yokohama, Japan

[73] Assignee: Canon Kabushiki Kaisha, Tokyo, Japan

[21] Appl. No.: 549,635

[22] Filed: Jul. 6, 1990

Related U.S. Application Data

[63] Continuation of Ser. No. 36,557, Apr. 9, 1987, abandoned.

[30] Foreign Application Priority Data

| Apr. 9, 1986 | [JP] | Japan | 61-82930 |
| Apr. 9, 1986 | [JP] | Japan | 61-82931 |
| Mar. 31, 1987 | [JP] | Japan | 62-78009 |

[51] Int. Cl.$^5$ .................. G06K 19/06; G11B 23/30
[52] U.S. Cl. .................. 369/44.26; 235/494; 235/487; 369/59; 369/275.3
[58] Field of Search ........... 235/454, 456, 487, 488, 235/494; 369/44.26, 47, 48, 54, 58, 59, 275.3

[56] References Cited

U.S. PATENT DOCUMENTS

| 3,351,948 | 11/1967 | Bonn | 346/76 L |
| 4,229,808 | 10/1980 | Hui | 369/48 |
| 4,534,031 | 8/1985 | Jewer | 369/59 |
| 4,598,393 | 7/1986 | Pierce et al. | 369/46 |
| 4,680,460 | 7/1987 | Drexler | 235/454 |
| 4,688,203 | 8/1987 | Koichi et al. | 369/58 |
| 4,695,991 | 9/1987 | Hudson | 369/59 |
| 4,769,802 | 9/1988 | Tatsuguchi | 369/47 |
| 4,811,321 | 3/1989 | Enari et al. | 369/59 |
| 4,910,725 | 3/1990 | Drexler et al. | 369/59 |

FOREIGN PATENT DOCUMENTS

| 0231009 | 8/1987 | European Pat. Off. |  |
| 59-60742 | 4/1984 | Japan . |  |
| 59-207039 | 11/1984 | Japan | 369/275 |
| 2133914 | 8/1984 | United Kingdom . |  |
| 2156978 | 10/1985 | United Kingdom . |  |

*Primary Examiner*—Stuart S. Levy
*Assistant Examiner*—Robert Weinhardt
*Attorney, Agent, or Firm*—Fitzpatrick, Cella, Harper & Scinto

[57] ABSTRACT

An optical information recording medium includes a plurality of rows of tracking tracks arranged at intervals, a plurality of recording portions provided between the tracking tracks and on which information is recorded by application of a light beam thereto, and an optically detectable mark provided at at least one location on at least one of the recording portions. The recording surface of the recording medium is divided into a recording area and a non-recording area in a direction perpendicular to direction of the plurality of rows of the tracking tracks. The optically detectable mark represents a boundary of the recording area and the non-recording area.

6 Claims, 9 Drawing Sheets

OPTICAL INFORMATION RECORDING MEDIUM INCLUDING AN OPTICALLY DETECTABLE MARK REPRESENTING A BOUNDARY BETWEEN THE RECORDING AND NON-RECORDING AREAS

This application is a continuation of prior application Ser. No. 07/036,557, filed Apr. 9, 1987, now abandoned.

BACKGROUND AND SUMMARY OF THE INVENTION

This invention relates to an optical information recording medium provided thereon with a mark indicative of a reference position, particularly a recording medium of the type in the form of a card, and an information recording-reproducing apparatus for such a recording medium.

As the forms of a recorded medium on which information is recording by the use of a light and the recorded information is read out, there are known various types, such as the form of a disc, the form of a card and the form of a tape. Among these, an optical information recording medium in the form of a card (hereinafter referred to as the optical card) has a great expected demand as a compact, light-weight and readily portable medium of great recording capacity.

Referring to FIG. 1 of the accompanying drawings which is a schematic plan view of an example of such an optical card, reference numeral 101 designates the optical card, reference numeral 103 denotes tracking tracks, and reference numeral 107 designate areas in which track numbers are recorded.

The card is scanned by a light beam modulated in accordance with recording information and stopped down into a minute spot, whereby information as a row of optically detectable recording pits (information tracks) is recorded on the optical card.

In order that at this time, information may be accurately recorded and reproduced without the trouble of intersection between information tracks being caused, the position of application of the light beam must be controlled in a direction perpendicular to the scanning direction (auto-tracking, which will hereinafter be referred to as AT). Also, in order that the minute spot may be stably applied in spite of the bending and mechanical error of the optical card, control must be effected in a direction perpendicular to the surface of the optical card (auto-focusing, which will hereinafter be referred to as AF).

A recording-reproducing method will now be described with reference to FIG. 1. Initially, the light beam lies at the home position outside the recording area. The light beam is then moved relative to the optical card 101 in the direction of arrow D to find a track to be recorded or reproduced, and scans this track in the direction of arrow F, thereby effecting recording or reproduction. Here, as means for detecting whether that track is a desired track, track numbers 107 (hereinafter referred to as the pre-format) pre-recorded on the extensions of the tracking tracks 103 as illustrated in FIG. 2 of the accompanying drawings are read and the read content is inspected to thereby determine whether the track is the desired track. Also, by making reference to the track number and the control information, whether that track is recorded can be known and thus, so-called overwriting, which means that information is further written on the recorded track by mistake, can be prevented.

In such an optical card, however, the tracking tracks which should not originally be discontinuous become partly discontinuous in the track number portion, and this provides disturbance to the AT control circuit system, which is undesirable in control. Also, track addresses as information data are preformed and therefore, where there is a defect such as a pin-hole at the location whereat this track number is formed, there has been a problem that malfunctioning occurs when the track number as data is read.

So, it would occur to mind to preform only tracking tracks on the recording medium instead of preforming addresses on the recording medium. In this case, however, there is a problem that when a desired recording portion is sought after, the spot fails to follow the desired track in the edge portion or goes beyond the final track and deviates from the surface of the medium.

On the other hand, the recording speed and reproducing speed of the optical information recording medium will be more and more improved by advancement in the future. Also, various modulation and demodulation systems will be adopted depending on how the medium is used. In the prior-art mediums, the aforementioned point has not been taken into account, and this has led to a disadvantage that it is difficult to secure mutual interchangeability in high-degree applied systems.

A first object of the present invention is to eliminate the aforementioned disadvantage regarding the formation of track addresses and to provide an optical information recording medium in which confirmation of a reference position can be reliably accomplished by a simple construction and overwriting can be avoided.

A second object of the present invention is to provide a recording-reproducing apparatus for such an optical information recording medium.

A third object of the present invention is to further eliminate the aforementioned disadvantage regarding the mutual interchangeability and to provide an optical information recording medium of simple construction which can also be used with high-degree systems which handle a plurality of types of mediums.

The first object of the present invention is achieved by an optical information recording medium which has tracking tracks arranged at intervals and recording portions provided between said tracking tracks and on which information is recorded by application of a light beam thereto, and in which an optically detectable mark indicative of a reference position is provided at at least one location in at least one of said recording portions.

The second object of the present invention is achieved by an information recording-reproducing apparatus having a light source, lens means for imaging the light beam from the light source on a recording medium, a photodetector for receiving the light from the recording medium, detector means for detecting a reference position mark on the recording medium on the basis of the signal from the photodetector, means for beginning auto-tracking on the basis of the signal from the detector means, and means for controlling a tracking actuator on the basis of the signal from the detecting means to start recording and reproduction of information from a predetermined position on the recording medium.

The third object of the present invention is achieved by an optical information recording medium which has tracking tracks arranged at intervals and recording portions provided between said tracking tracks and on which information is recorded by application of a light beam thereto, and in which an optically detectable mark indicative of the type of the medium is provided at at least one location on said recording portions.

Other objects and features of the present invention will become apparent from the following detailed description of the embodiments thereof taken in conjunction with the accompanying drawings.

DESCRIPTION OF THE PREFERRED EMBODIMENTS

Figure 1:
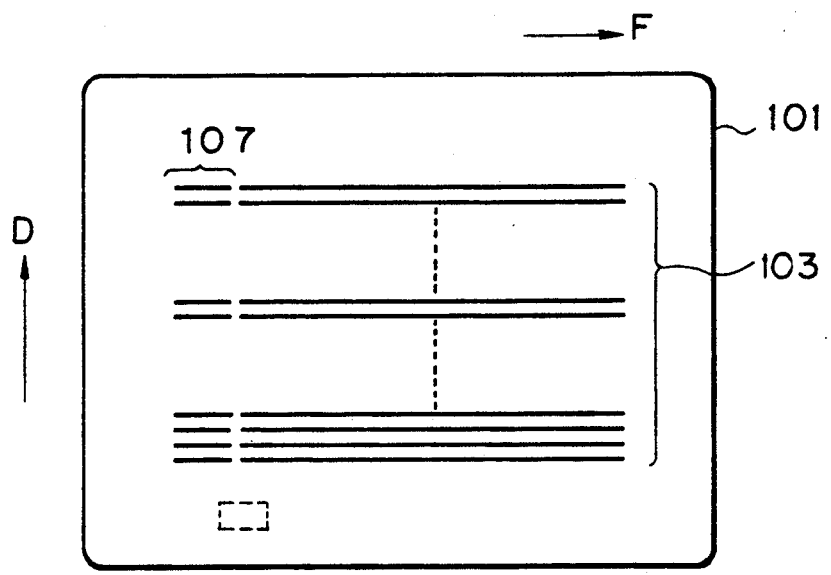
FIG. 1 is a plan view showing an example of the optical information recording medium according to the prior art.
Figure 2:
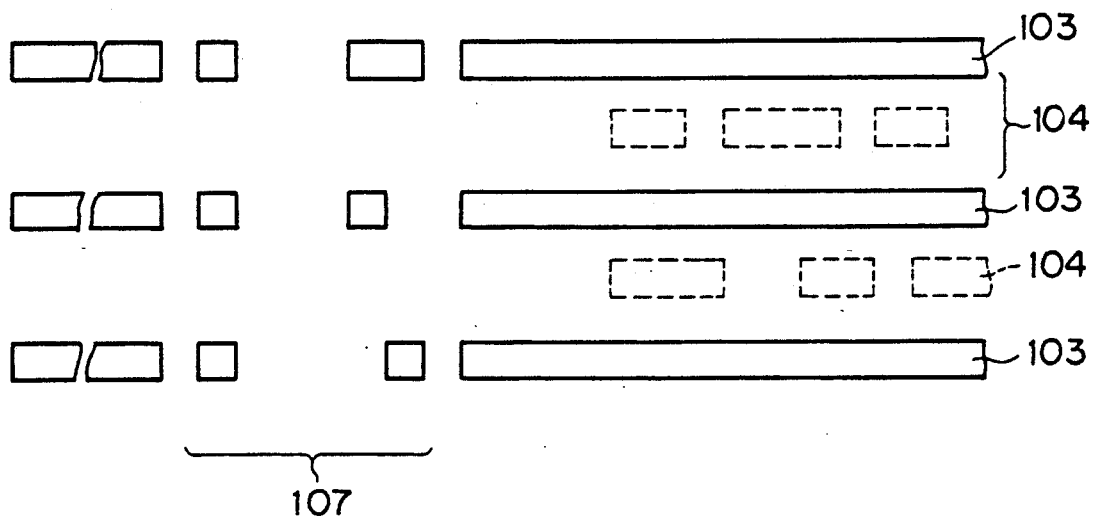
FIG. 2 is an enlarged plan view of a portion of FIG. 1.
Figure 3:
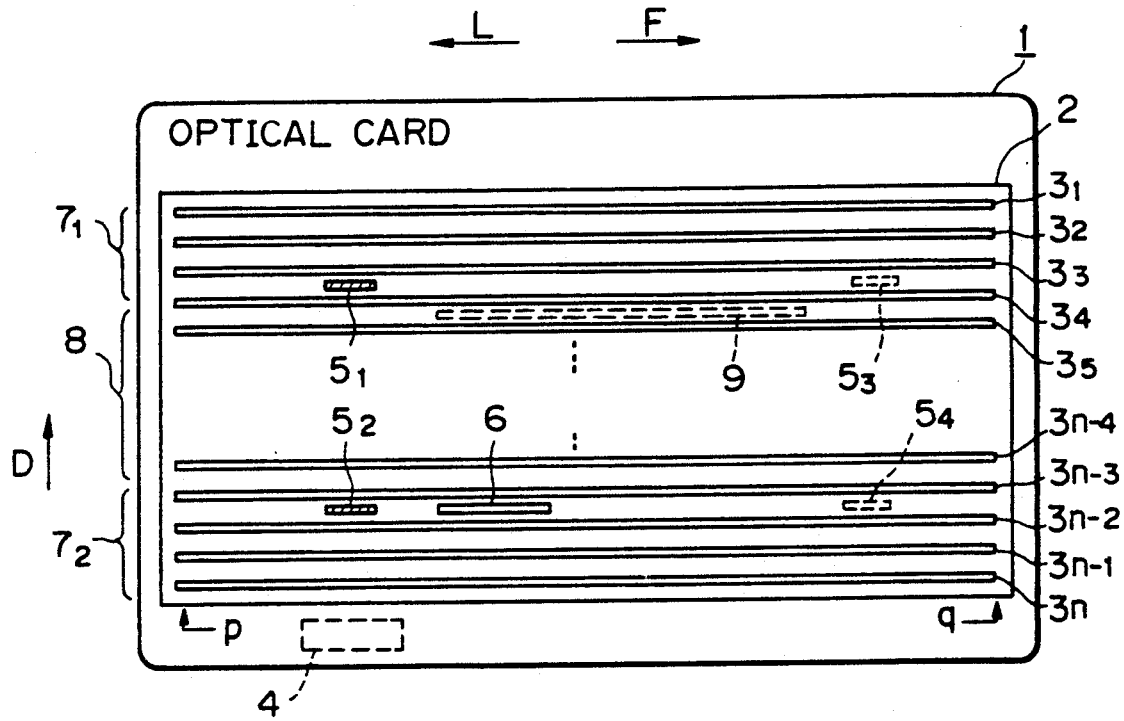
FIG. 3 is a plan view showing an embodiment of the optical information recording medium of the present invention.

FIG. 3 is a schematic plan view of an optical card to which the present invention is applied. In FIG. 3, the optical card 1 comprises a substrate formed of a plastic material or the like, and a recording layer 2 formed on the substrate and formed of a silver salts material, a dye, a chalcogen material or the like on which information can be optically recorded. Tracking tracks $3_1, 3_2, 3_3, 3_4, 3_5, \ldots, 3_{n-4}, 3_{n-3}, 3_{n-2}, 3_{n-1}, 3_n$ performed in the form of continuous lines are disposed parallel and at equal intervals on the recording layer 2. Recording portions for recording information thereon are provided between adjacent tracks. That is, the optical card 1 has recording portions between all adjacent tracking tracks. Marks $5_1$ and $5_2$ (hereinafter referred to as the G marks) indicative of optically detectable reference positions are formed at two locations in said recording portions (i.e., at each one location in each different recording portion). A medium identifying pattern 6 is formed on that recording portion in which the G mark $5_2$ is provided.

Figure 4:
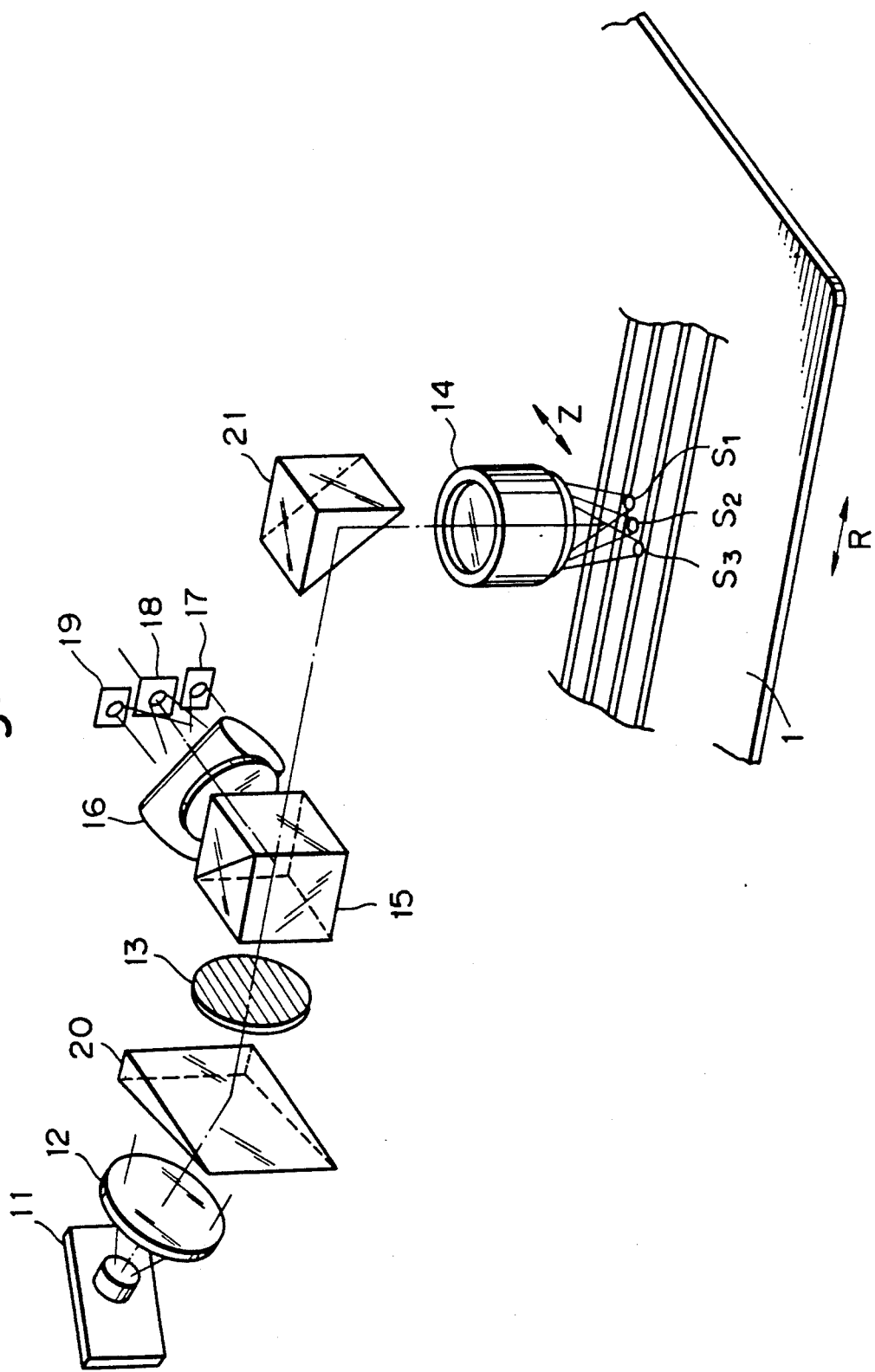
FIG. 4 is a perspective view showing an example of a recording-reproducing apparatus for the medium shown in FIG. 3.
Figure 5:
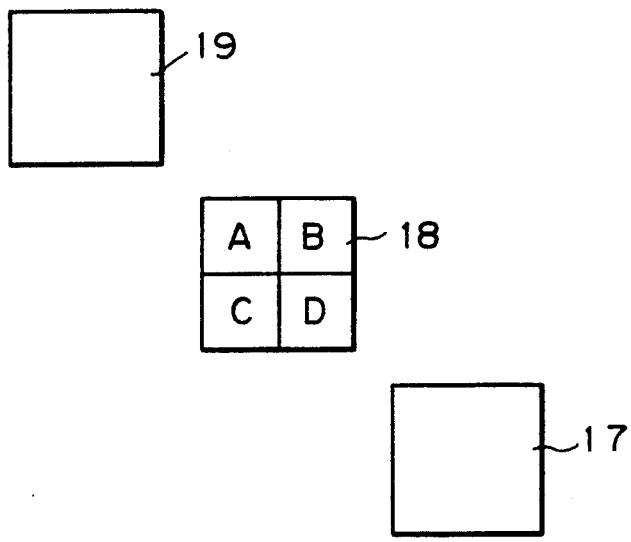
FIG. 5 shows the light-receiving surfaces of photodetectors shown in FIG. 4.

FIG. 4 illustrates the construction of an embodiment of an optical information recording-reproducing apparatus for effecting recording and reproduction on the optical card of the present invention. A beam emitted from a light source 11 such as a semiconductor laser is collimated by a collimator lens 12 and is divided into three beams by a diffraction grating 13. These beams are imaged on the optical card 1 as shown in FIG. 3 by an objective lens 14 and form beam spots $S_1$, $S_2$ and $S_3$, respectively. The optical card 1 is moved in the direction of arrow R by drive means, not shown, and is scanned by said beam spots in the direction in which the tracking tracks extend. The reflected lights of the beam spots $S_1$, $S_2$ and $S_3$ again pass through the objective lens 14, are reflected by a beam splitter 15 and are projected onto photodetectors 17, 18 and 19 by a condensing lens system 16. The condensing lens system 16 is an astigmatic system and is arranged to effect AF in a well-known astigmatic type. The photodetectors are arranged as shown in FIG. 5. In FIG. 4, reference numeral 20 designates a prism for converting the cross-section distribution of the collimated light beam from an ellipse to a circular shape, and reference numeral 21 denotes a mirror for directing the light beam to the objective lens 14. The photodetector 18 has its light-receiving surface divided into four as indicated by A, B, C and D in FIG. 5. The operation of recording information on the optical card by the use of the aforedescribed apparatus will now be described with reference to FIG. 6. First, when information is to be recorded on a recording portion 10, spots $S_1$, $S_2$ and $S_3$ are applied to the tracking track $3_4$, the recording portion 10 and the tracking track $3_5$, respectively. These spots are scanned in the direction of arrow F of FIG. 3 relative to the card 1 by movement of the optical card 1 as shown in FIG. 4. The reflected light from the spot $S_1$ enters the aforementioned photodetector 17, and the reflected light from the spot $S_3$ enters the photodetector 19, and a tracking signal is detected from the output signals of these photodetectors. That is, if the spots $S_1$ and $S_3$ deviate relative to the tracking tracks $3_4$ and $3_5$, there occurs a difference between the intensities of the lights entering the photodetectors 17 and 19, and a tracking signal is obtained by comparing the signals from the light-receiving surfaces of these photodetectors. On the basis of this tracking signal, the spots $S_2$ and $S_3$ are moved together in a direction (direction D) perpendicular to the scanning direction by tracking means (for example, in FIG. 4, means for moving the objective lens 14 in a direction Z in the optical head), whereby AT is effected. A record pit 9 is accurately recorded in the recording portion 10 along the tracking tracks $3_4$ and $3_5$ by the spot $S_2$. The recorded pit is indicated by a broken line in FIG. 3.

Figure 7:
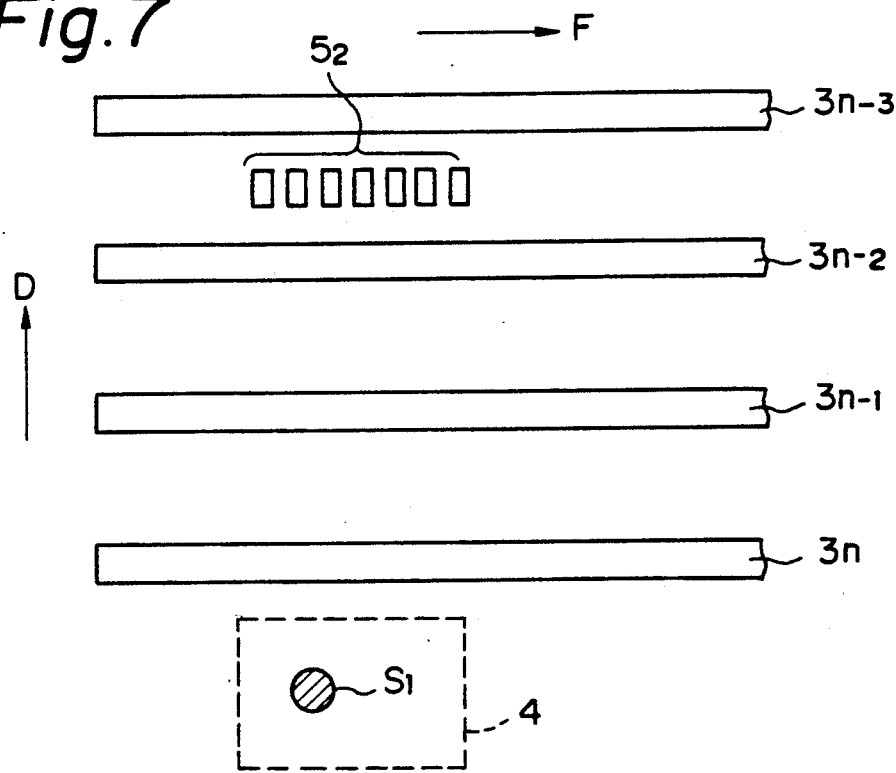
FIG. 7 is an enlarged view of a portion of FIG. 3.

The function of the G marks will now be described. FIG. 7 is an enlarged view showing the portion in which the G mark $5_2$ is provided. Actually, the G mark $5_2$ is formed in the form of a discontinuous broken line as shown in FIG. 7.

Figure 8:
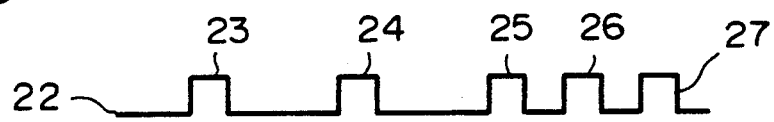
FIGS. 8 and 9 show the wave forms of detection signals.

Initially, the light spot $S_1$ lies at the home position 4, and when this light spot $S_1$ is moved in a direction D by optical head driving means, the level of the detection signal 22 of the reflected light of the spot $S_1$ varies as shown in FIG. 8. That is, when the spot $S_1$ is moved in the direction D and crosses the tracking track $3_n(23)$ the first variation appears, and the level likewise varies each time the spot $S_1$ crosses the tracking track $3_{n-1}(24)$, the tracking track $3_{n-2}(25)$ and the G mark $5_2(26)$. If at this time, the speed of movement of the spot is constant, it can be discriminated by the use of a time measuring circuit that the spot has crossed the G mark $5_2$, because the time between 25 and 26, the time between 23 and 24 and the time between 24 and 25 differ apparently from one another. Subsequently, when the light spot $S_1$ has come onto the tracking track $3_{n-3}$ (as indicated at 27 in FIG. 8), the light spot $S_3$ lies on the tracking track $3_{n-2}$ as is apparent in FIG. 6 and therefore, the movement of the light spot is stopped.

Subsequently, in this state, the card 1 is moved in a direction F to feed the spot to position p on the card 1, whereafter the card 1 is moved in a direction L to position feed the spot to q (FIG. 3). The variation in the signal level obtained from the reflected light of the light spot $S_2$ is low when the spot has been fed to position p in FIG. 9, and then the direction of feeding of the card is reversed and the time during which the variation is high is measured while the spot is passing the G mark $5_2$, and if this time is longer than a predetermined time, the G mark is judged, and if there is no variation in the signal until the spot arrives at the point q, it is judged that the current track is the reference track on which the desired G mark is provided. By disposing the preformed G marks at predetermined locations on the card 1 as described above, the reference track can be reliably identified even if track numbers are not disposed for the tracking tracks. On the basis of this reference track, information is recorded on the parallel recording portions in succession while the spot is moved in the direction of arrow D of FIG. 3. When another G mark $5_1$ is detected, the recording portion provided with that G mark is judged as the final track and thus, recording is terminated.

That is, in the present embodiment, the surface of the medium is divided into a recording area 8 and non-recording areas $7_1$ and $7_2$, and the boundaries therebetween are indicated by G marks $5_1$ and $5_2$. Tracking tracks $3_n$, $3_{n-1}$ and $3_{n-2}$ provided in the recording area $7_2$ are not used for the recording of information, but are merely used as guard tracks. For example, if the recording portion most adjacent to the home position is set as the reference track, when the light spot is moved in the direction D of FIG. 3 and has crossed the tracking track which is first to appear, an AT control circuit tries to rapidly follow the track and therefore, light pickup (namely, the light spot) also moves rapidly and moreover, greatly. As a result, there may occur the malfunctioning that the light spot follows the next track due to overshoot. Accordingly, in the present embodiment, more than two tracking tracks $3_n$, $3_{n-1}$, $3_{n-2}$ are provided outside the recording portion on which the G mark $5_2$ is provided, whereby the introduction into these tracking tracks is reliably accomplished, and then the detection of the G mark $5_2$ is started.

Also, tracking tracks $3_1$, $3_2$, $3_3$ likewise provided in the non-recording area $7_1$ are used as guard tracks. That is, when during the access to the tracks, the G mark $5_1$ fails to be detected by mistake and the spot goes past the final track, the spot is drawn in by any one of these guide tracks to thereby prevent the spot from jumping out of the surface of the medium. Desirably, two or more tracking tracks should be formed outside the G mark $5_1$.

The G mark $5_2$ which is a discontinuous pattern as shown in FIG. 7 is particularly preferable in that a detection signal appears clearly when the spot crosses such G mark, but the G mark may be a strip-like pattern to obtain a similar effect.

Also, by providing G marks at the q side also as indicated at $5_3$ and $5_4$ in FIG. 3, the location interposed between HIGH signals of predetermined time widths is judged as the reference track between positions p and q, whereby reliable detection of the reference position which is hardly affected by flaws or dust can be accomplished.

Figure 6:
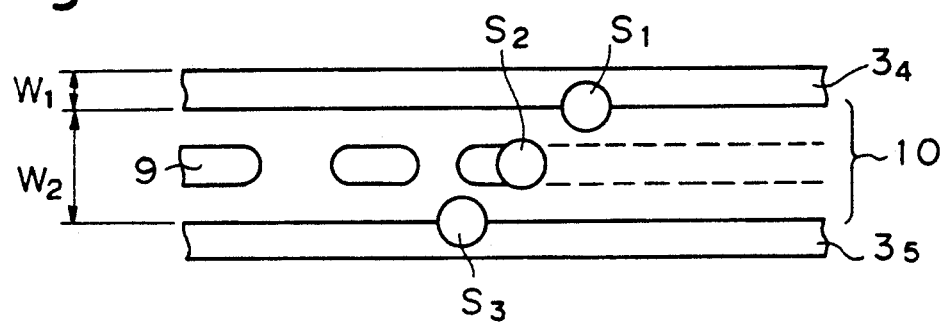
FIG. 6 is a plan view of the medium illustrating the recording process.

When the present invention is applied to an optical card as in the aforedescribed embodiment, it is desirable that the width $W_1$ of the tracking track shown in FIG. 6 be 2.5 μm or greater. The reason for this will hereinafter be described.

An optical information recording medium usually has a transparent protectively layer provided on a recording layer on which a beam spot is imaged. The diameter of the light beam on the surface of the protective layer is greater than the diameter of the spot on the recording layer. Accordingly, even if dust or the like adheres to the surface of the protective layer, the influence thereof upon signal detection will be small. In optical discs or the like, on the basis of such a principle, the track width is of the order of 1-2 μm to achieve high density. In optical cards, however, the card thickness is limited to the order of 0.8 mm from the viewpoint of making the size of the optical cards common to the size of ordinary credit cards. Accordingly, the thickness of the transparent protective layer must unavoidably be of the order of ⅓ to 1/2.5 of the thickness of the optical discs, and when the influence of dust or the like is taken into account, the width of the tracking tracks must be 2.5 μm or greater. For the same reason, it is desirable that the interval between the tracking tracks, i.e., the width $W_2$ of the recording portion, be 2.5 μm or greater.

Figure 10:
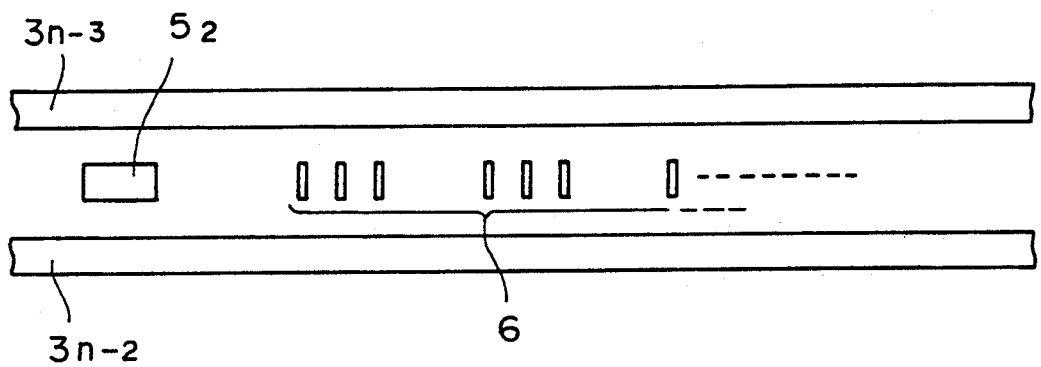
FIG. 10 is an enlarged view of a portion of FIG. 3.
Figure 11:
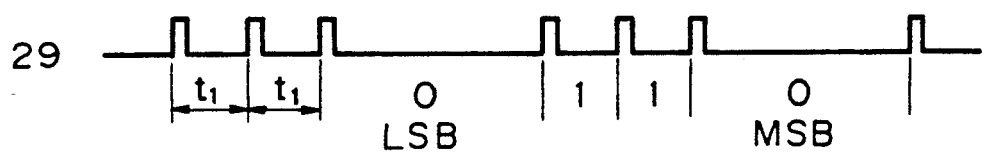
FIG. 11 shows the wave form of a signal detected from a medium type identifying pattern.
Figure 12:
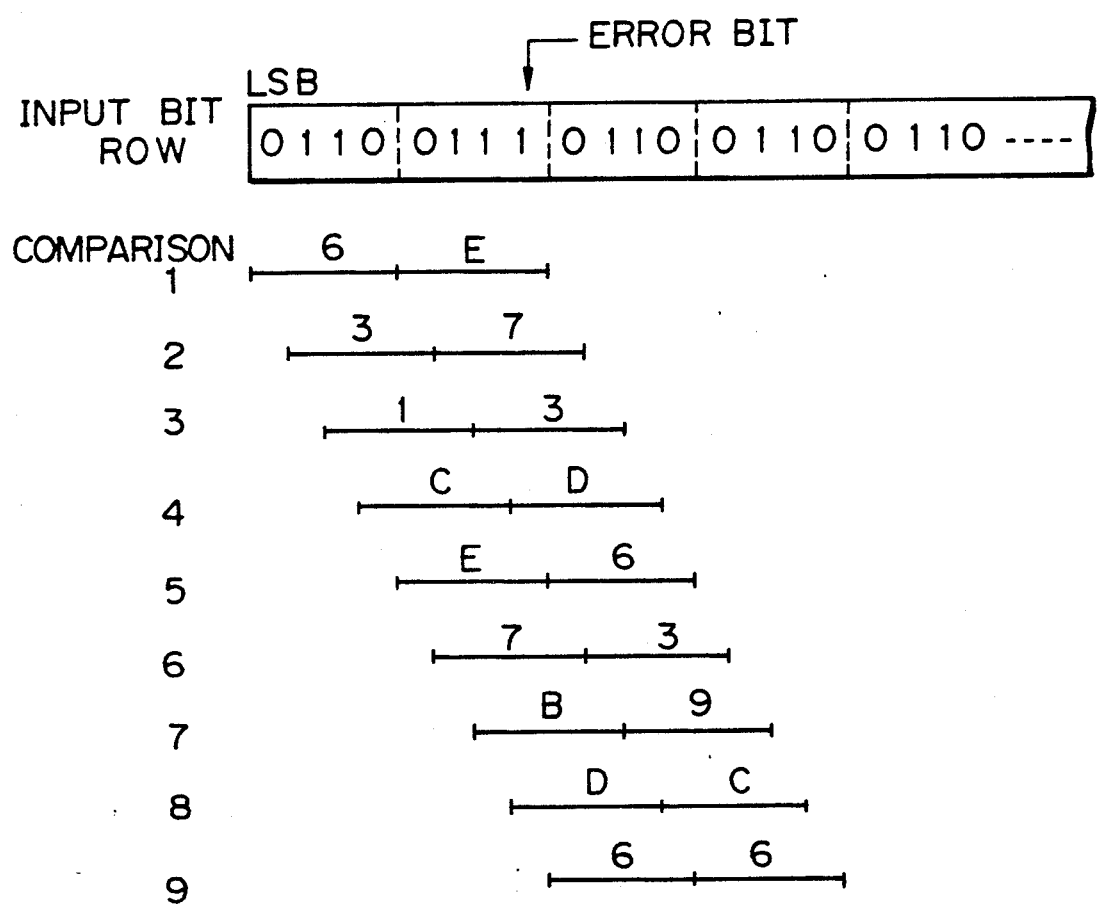
FIG. 12 illustrates another example of the medium type identifying pattern.

The function of the medium identifying pattern will now be described. FIG. 10 is a fragmentary enlarged view of the optical card of FIG. 3. The medium identifying pattern 6 (hereinafter simply referred to as the pattern) is formed by a pre-format or a light spot on the extension of the track on which there is the G mark $5_2$. The feature of this pattern is that it is a pre-format entirely different from the other data recording portions and it is of the type which does not depend on the speed during the read-out and can accomplish processing by a very simple circuit without using a circuit for reproducing and demodulating the other data recording portions. The type shown in FIG. 10 is a kind of FM modulation system, and the signal 29 detected by the aforementioned photodetector 18 (spot $S_2$) is such as shown in FIG. 11. At first, the time $t_1$ from the rising until the rising of the signal is measured N times (in FIG. 11, two times) and the average value thereof is calculated, and that value is used as the reference time thereafter. As regards the decision expression for 1 and 0, when $t_1$ is the reference time and T is the measured time, if for example, $T > 2t_1$, 0 is judged, and if $0.5t_1 < T < 2t_1$, 1 is judged. Accordingly, in the case of FIG. 11, the signal is judged is "0110". Further, to improve the reliability, the whole is constructed of a repetition pattern at each M bits (in the present embodiment, M=4) and comparison is made for each M bits with each 1 bit deviated, and when the same bit pattern continues, that pattern is recognized as the number inherent to the medium. In the case of FIG. 12, the eight bit in the input bit row is wrong and therefore, the same bit pattern continues in the ninth comparison and as a result, the number "$6_{(15)}$" inherent to the medium is recognized.

For example, when the pattern "$6_{(15)}$" (the present embodiment) is defined as a medium of MFM modulation and speed of 100 mm/sec. and the pattern "1" is defined as a medium of 8-14 conversion and speed of 200 mm/sec., when the recording-reproducing apparatus is of the MFM modulation type and reads the pattern at a speed of 100 mm/sec., if the pattern information is "1", the recording-reproduction speed is set to 200 mm/sec. in accordance with the pattern information and the modulating-demodulating circuit is changed over from MFM modulation to the 8-14 conversion side, whereby recording and reproduction on the medium of 8-14 conversion become possible. In the case of an apparatus which does not have a modulating-demodulating circuit of 8-14 conversion, information having the meaning that "recording and reproduction are impossible" is sent to an apparatus of a higher rank, not shown, which controls the recording-reproducing apparatus, or it is made known to the operator by a buzzer, a lamp or the like provided on the recording-reproducing apparatus that "recording and reproduction are impossible".

Thus, recording and reproduction on a variety of mediums becomes possible by simple hardware and software. Also, in FIG. 3, the pattern 6 is disposed on the track on which the G mark $5_2$ is present, and this is for the purpose of preventing the area in which data can be recorded from decreasing, and the effect of the present invention will still be obtained even if the pattern 6 is disposed on any other track.

As described above, when a mark for identifying the medium is provided in a part of the recording portion, the identification of the medium can be reliably accomplished by a simple construction and such a recording medium can be used with a system in which a plurality of kinds of mediums are handled.

Besides the above-described embodiment, various applications of the present invention are possible. For example, the shape of the medium is not limited to a card-like shape, but a tape-like shape or the like is also applicable.

An example of the information recording and reproducing apparatus according to the present invention will now be described in more detail.

Figure 13:
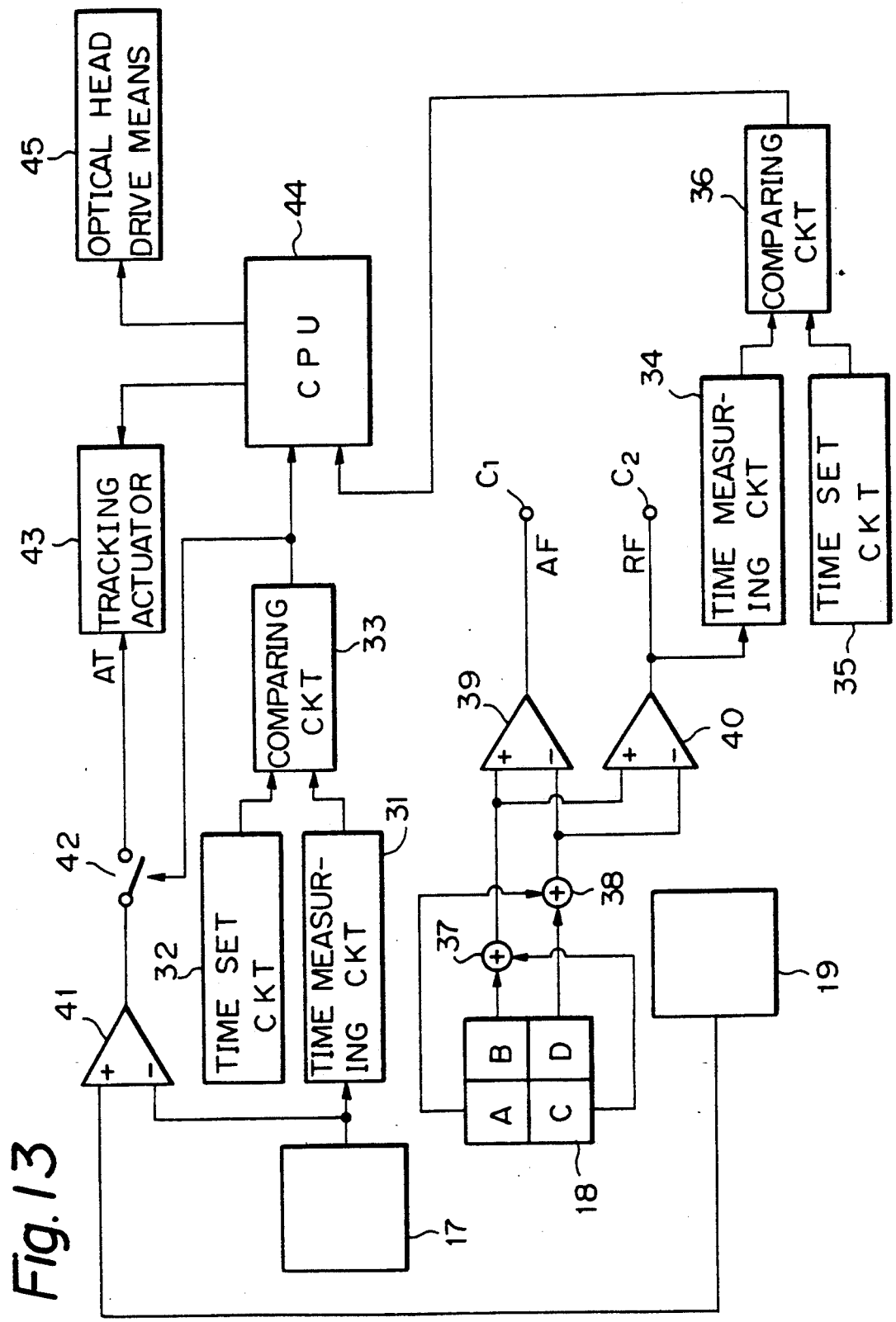
FIG. 13 is a block diagram showing an example of the signal processing circuit in the apparatus shown in FIG. 4.

FIG. 13 is a block diagram showing an example of the construction of the signal processing of the circuit in the apparatus shown in FIG. 4. In FIG. 13, the outputs of the light-receiving surfaces B and C of the photodetector 18 are input to an adder 37 and the outputs of the light-receiving surfaces A and D of the photodetector 18 are input to an adder 38, and the outputs of these adders are differentiated by a differential amplifier 39, whereby an AF signal is obtained from a terminal $C_1$. Also, the outputs of these adders are added together by an addition amplifier 40, and during reproduction, an information signal RF is obtained from a terminal $C_2$. The outputs of photodetectors 17 and 19 are differentiated by a differential amplifier 41, move the objective lens 14 in the direction Z (FIG. 4) through a switch 42 and are input to a tracking actuator 43 which effects AT.

When information is to be recorded, optical head drive means 45 moves the entire optical head of FIG. 4 in the direction D of FIG. 3 by the instruction from a central processing unit (CPU) 44. Thereupon, the spot $S_1$, which has so far lain at the home position 4 crosses the tracking track and a track crossing pulse as shown in FIG. 8 is output from the photodetector 17. At this time, the switch 42 is in its open state. The track crossing pulse is input to a time measuring circuit 31 and the interval between the pulses is measured. The time measuring circuit 31 is reset each time the pulse is input thereto, thereby starting time measurement. A time corresponding to the interval between the tracking track and the G mark is set in a time set circuit 32. This set time and the output of the time measuring circuit 31 are compared by a comparing circuit 33, and when the next pulse is detected within the set time, it is judged that the G mark has been crossed, and a signal is sent to the CPU 44 to stop the movement of the optical head. Simultaneously therewith, the switch 42 is closed to effect introduction of AT.

Figure 9:
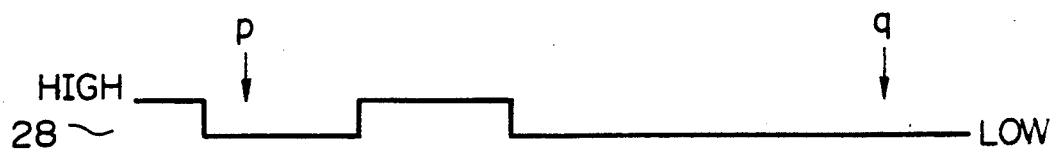

Subsequently, with AT being applied, the card 1 is fed to position p in the direction F of FIG. 3, whereafter it is fed to position q in the direction L, and the introduced recording portion is scanned by the spot $S_2$. Thereupon, a signal as shown in FIG. 9 is output from the addition amplifier 40. This output signal is input to a time measuring circuit 34, by which the time of the HIGH state is measured. The measured time is compared by a comparing circuit 36 with a time corresponding to the length of the G mark preset in a time set circuit 35, and when these are coincident with each other, it is confirmed that the track which is then being scanned is the reference track, and a sign for starting recording is sent to the CPU 44. If the signal as shown in FIG. 9 is not output, the spot $S_2$ is moved to the adjacent recording portion and the operation is repeated until the G mark is detected.

When the G mark is confirmed as described above, the CPU 44 sends a jump pulse to the tracking actuator 43 to thereby move the objective lens and apply the spot $S_2$ to the recording portion neighboring the reference track. Then, information is recorded while the card is reciprocally moved in the directions L and F. When the recording of information on this recording portion is completed, the spot $S_2$ is moved to the next recording portion and recording of information is continued to be effected. Thus, information is recorded on the recording portions of the recording area 8 in succession while the spot $S_2$ is moved. When all the information is recorded, the spot $S_2$ is moved to the home position 4, thus completing a series of operations. Where additional recording of information is to be effected on the thus recorded card, the reference track is confirmed as previously described, whereafter the recording area is scanned by the spot $S_2$ and the recorded final recording portion is found out, and recording is started from the next recording portion.

Figure 14:
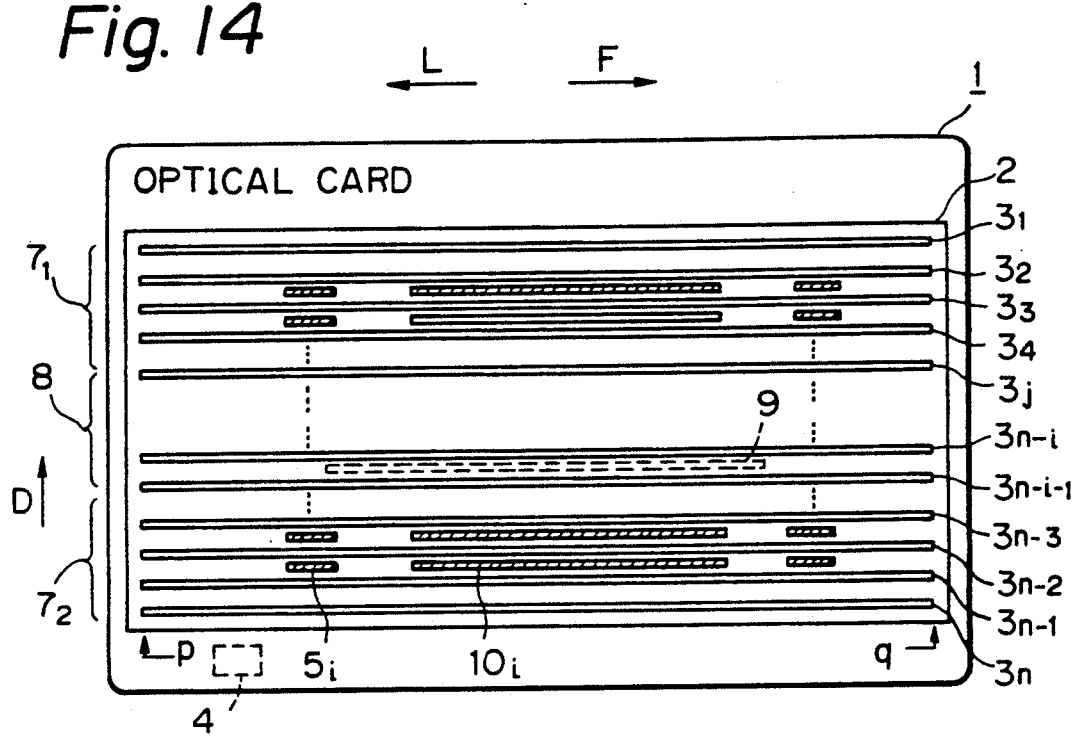
FIG. 14 is a plan view showing another embodiment of the optical information recording medium of the present invention.
Figure 15:
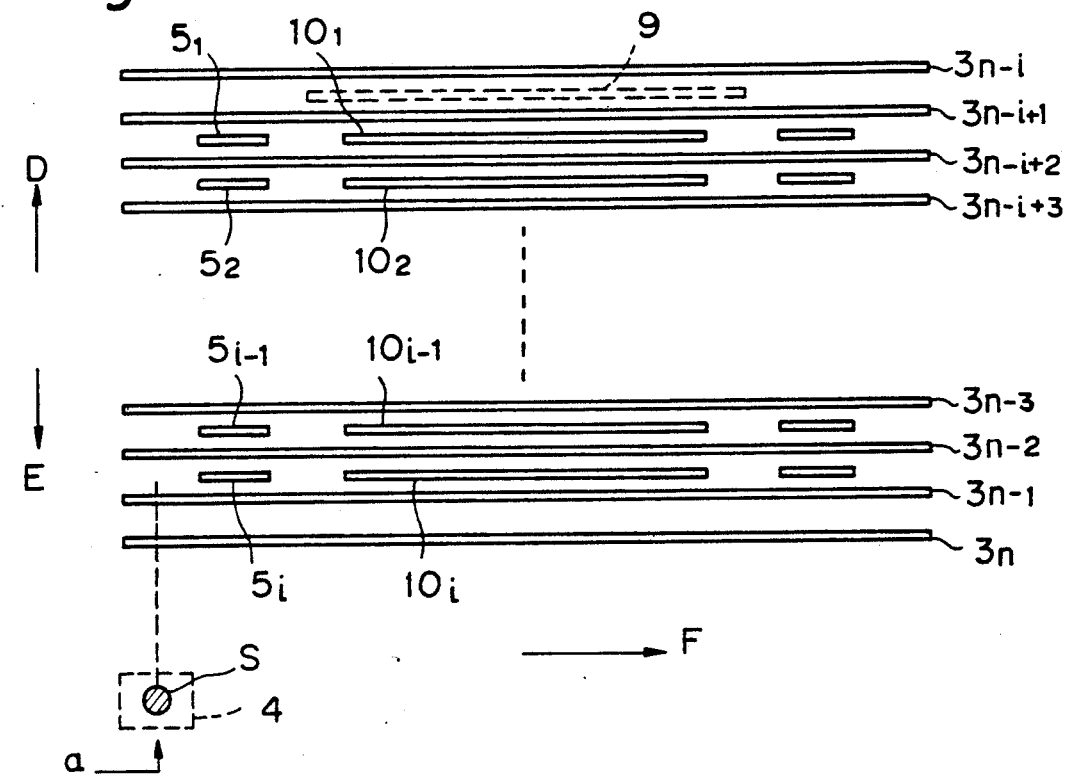
FIG. 15 is an enlarged plan view of a portion of FIG. 14.

In the above-described embodiment, each one recording portion provided with a G mark is provided at the opposite sides of the recording area, but a plurality of such recording portions may be provided at each of the opposite sides of the recording area. FIG. 14 is a schematic plan view showing such an embodiment, and FIG. 15 is an enlarged plan view of the non-recording area $7_2$ in FIG. 14. In FIGS. 14 and 15, members similar to those in FIG. 3 are given similar reference characters and need not be described in detail. In the present embodiment, a plurality of recording areas provided with G marks $5_1, \ldots, 5_i$ are provided at each of the opposite sides of the recording area 8. Also, the recording areas provided with the G marks are formed with G mark identifying patterns $10_1, \ldots, 10_i$ indicative of the locations of these recording portions.

Figure 16:
FIG. 16 shows the wave form of a detection signal.

Description will now be made of a method of detecting the reference track when the card 1 of FIG. 14 is used. Initially, the light spot S lies at the home position 4 and here, introduction of AF is effected and thereafter, AF control always continues to be effected. Thereafter, the optical head as shown in FIG. 4 is moved in the direction D and when the spot S is scanned in the direction D, the level of the detection signal of the reflected light of the spot S varies as shown in FIG. 16. That is, when the spot S is moved in the direction D and has crossed the tracking track $3_n$, the first variation appears, and variation occurs each time the spot S likewise crosses the tracking track $3_{n-1}$, $3_{n-2}$.

This signal is counted k times and when the light spot has come onto the tracking track $3_{n-k}$, the movement of the light spot is stopped and the spot is introduced in this tracking track, whereby AT control is effected. Even if at this time, a drive system, not shown, for moving the light spot is stopped, the light spot actually tends to go past several tracks due to the mechanical accuracy. Also, an error occurs when the spot is introduced to effect AT control. If the value of k is set so that the error resulting from these two factors is smaller than i−k, where i is the number of data tracks in which the G marks between the tracking tracks are present, the G mark is present without fail on the track into which the spot has been introduced.

Subsequently, in this state, the card is fed in the direction of arrow L. The variation in the signal level obtained from the then reflected light of the light spot S is such as shown in FIG. 9, and if the time during which the signal level is high is measured while the spot is passing the G mark 5 and that time is a predetermined time or longer, the G mark is judged. Simultaneously therewith, the distance from the card feed starting position a of the light spot S (see FIG. 15) to the G mark 5 is measured and this value is used as the reference position in the direction parallel to the tracks.

Figure 17:
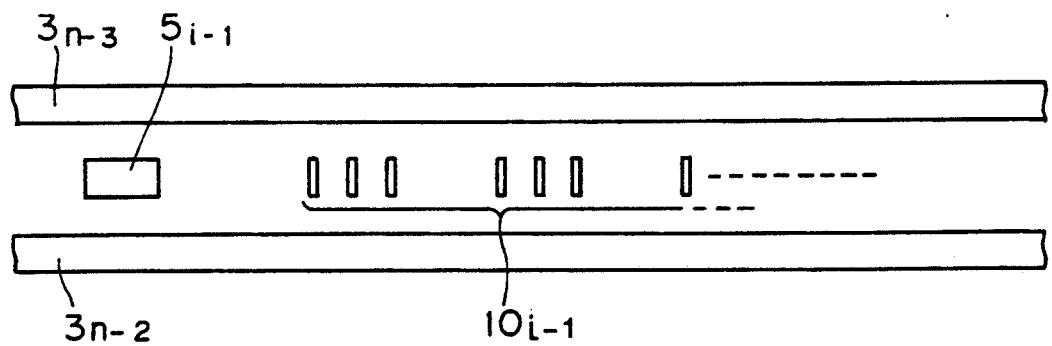
FIG. 17 is an enlarged view of a portion of FIG. 14.

Subsequently to the detection of the G mark, a G mark identifying pattern 10 is detected by the scanning of the spot S. The G mark identifying pattern 10, as shown in FIG. 17, is recorded in a format similar to that of the aforementioned medium identifying pattern 6, and can be read in a manner similar to that described in connection with FIG. 12, etc. for example.

The number of the types of this pattern corresponds to the number of G mark tracks, and in FIG. 15, patterns 1, 2, ..., i correspond to the G marks $5_1$, $5_2$, ..., $5_i$. Accordingly by reading of these patterns, identification of the G mark, namely, the position on the card at which the G mark of this recording portion lies, can be known.

For example, when information is to be recorded on the first recording portion like the recording pit 9 of FIG. 14, the G marks and the G mark identifying patterns are detected as previously described. If those patterns are m, the spot S is moved by m tracks in the direction D, whereafter recording is started. This movement of the spot S is accomplished not by movement of the optical head, but for example, only by the tracking actuator as previously described (the kick operation). In this kick operation, the error during the track movement hardly occurs and therefore, information can be recorded from a correct position. The recording operation after this is entirely similar to the case of FIG. 3.

The portion $7_1$ of FIG. 14 likewise has a plurality of recording portions provided with G marks. When recording is to be effected downwardly from the uppermost portion of the recording area 8, the G mark in the portion $7_1$ is used as the reference position. In this case, the G mark identifying patterns are designated by 1, 2, 3, . . . , i from below to above as viewed in FIG. 14, so that they are vertically symmetrical with respect to the direction orthogonal to the tracking tracks. Thus, the positioning method when the light beam is moved from the outer side toward the center of the card can be carried out with respect to the non-recording area $7_1$ by the same processing as that with respect to the non-recording area $7_2$.

In the above-described embodiment, even if flaws, dust or the like is present between the home position 4 and the first tracking track $3_n$ and a signal equal to the track crossing signal as show in FIG. 16 is produced, when the number of G mark tracks is i and the count number of the crossing signal is k, there will be no problem if the error signal is an error signal of i−k times.

Also, even if dust, flaws or the like are present on the G mark tracks and AT control cannot be effected and there is any track on which no G mark can be detected, the position reference can be found normally if the G marks on the other tracks can be detected.

Thus, in the embodiment of FIG. 14, detection of the G marks is accomplished reliably and quickly.

What is claimed is:

1. An optical information recording medium comprising:
   a plurality of rows of tracking tracks arranged in an arrangement direction at intervals on the recording medium;
   a plurality of recording portions provided between rows of said tracking tracks and on which information is recorded by application of a light beam thereto;
   a recording area including at least one of said plurality of tracking tracks and said plurality of recording portions in the arrangement direction of said tracks;
   at least two guard tracks arranged in regions on either side of the recording area, the guard track regions being outside of the recording area; and
   an optically detectable indicator outside of the recording area for distinguishing said guard tracks from said tracking tracks.

2. An optical information recording medium according to claim 1, wherein said indicator is provided in the arrangement direction of said tracking tracks in the guard track regions on either side of the recording area.

3. An optical information recording medium according to claim 1, wherein said indicator comprises a discontinuous pattern.

4. An optical information recording medium according to claim 1, further comprising an additional optically detectable indicator provided between said guard tracks for indicating type of recording medium.

5. An optical information recording medium according to claim 4, wherein said additional optically detectable indicator comprises a format different from that of information to be recorded in the recording area.

6. An optical information recording medium according to claim 4, wherein said additional optically detectable indicator comprises a repetition pattern including a plurality of marks.

* * * * *

UNITED STATES PATENT AND TRADEMARK OFFICE
CERTIFICATE OF CORRECTION

PATENT NO. : 5,038,332  Page 1 of 2
DATED : August 6, 1991
INVENTOR(S) : Wataru Sakagami, et al.

It is certified that error appears in the above-identified patent and that said Letters Patent is hereby corrected as shown below:

ON THE TITLE PAGE:

IN U.S. PATENT DOCUMENTS

"Koichi et al." should read --Koishi et al.--.

IN THE DISCLOSURE

COLUMN 5

Line 12, "posi-" should be deleted; and
Line 13, "tion feed the spot to q" should read --feed the spot to position q--.

UNITED STATES PATENT AND TRADEMARK OFFICE
CERTIFICATE OF CORRECTION

PATENT NO. : 5,038,332

DATED : August 6, 1991

INVENTOR(S) : Wataru Sakagami, et al.

It is certified that error appears in the above-identified patent and that said Letters Patent is hereby corrected as shown below:

COLUMN 6

Line 1, "side also" should read --side--;
    Line 14, "protectively" should read --protective--; and
    Line 57, "is judged" should read --judged--.

COLUMN 9

Line 46, "Accordingly" should read --Accordingly,--.

Signed and Sealed this

Sixteenth Day of March, 1993

Attest:

STEPHEN G. KUNIN

*Attesting Officer*    *Acting Commissioner of Patents and Trademarks*